United States Patent
Yilmaz

(10) Patent No.: US 11,150,372 B2
(45) Date of Patent: Oct. 19, 2021

(54) CIRCUMVENTING VELOCITY UNCERTAINTY IN IMAGING COMPLEX STRUCTURES I-CUBE

(71) Applicant: Özdoğan Yilmaz, Urla (TR)

(72) Inventor: Özdoğan Yilmaz, Urla (TR)

( * ) Notice: Subject to any disclaimer, the term of this patent is extended or adjusted under 35 U.S.C. 154(b) by 823 days.

(21) Appl. No.: 15/862,686

(22) Filed: Jan. 5, 2018

(65) Prior Publication Data

US 2019/0094399 A1 Mar. 28, 2019

Related U.S. Application Data

(60) Provisional application No. 62/562,611, filed on Sep. 25, 2017.

(51) Int. Cl.
| | |
|---|---|
| *G01V 1/34* | (2006.01) |
| *G01V 1/28* | (2006.01) |
| *G01V 1/30* | (2006.01) |
| *G01V 1/32* | (2006.01) |

(52) U.S. Cl.
CPC .............. *G01V 1/345* (2013.01); *G01V 1/288* (2013.01); *G01V 1/303* (2013.01); *G01V 1/32* (2013.01); *G01V 2210/46* (2013.01); *G01V 2210/512* (2013.01); *G01V 2210/514* (2013.01)

(58) Field of Classification Search
None
See application file for complete search history.

(56) References Cited

U.S. PATENT DOCUMENTS

2014/0133275 A1* 5/2014 Guan .................... G01V 1/301
367/53

OTHER PUBLICATIONS

Clapp, Geologically Constrained Migration Velocity Analysis, Mar. 2001, Stanford University, pp. 1-176 (Year: 2001).*
Rickett et al., Offset and angle-domain common image-point gathers for shot-profile migration, 2002, Geophysics, vol. 67 No. 3, pp. 883-889 (Year: 2002).*
Yilmaz, Circumventing velocity uncertainty in imaging complex structures, Jan. 2018, The Leading Edge, pp. 14-18 (Year: 2018).*

* cited by examiner

*Primary Examiner* — Omar F Fernandez Rivas
*Assistant Examiner* — Bernard E Cothran
(74) *Attorney, Agent, or Firm* — Shannon Warren

(57) ABSTRACT

A zero-offset wavefield synthesis workflow to calculate a synthesized zero-offset wavefield output without the commitment to an rms velocity field output to circumvent velocity uncertainty. Said zero-offset wavefield synthesis workflow comprises calculating a migration cube output. Rendering a demigration cube output from said migration cube output with a demigration cube calculation. Rendering said synthesized zero-offset wavefield output from said demigration cube output with a zero-offset wavefield synthesis procedure.

20 Claims, 11 Drawing Sheets

CIRCUMVENTING VELOCITY UNCERTAINTY IN IMAGING COMPLEX STRUCTURES I-CUBE

CROSS-REFERENCE TO RELATED APPLICATIONS

This application is the nonprovisional filing making reference to U.S. Patent Application No. 62/562,611 filed on Sep. 25, 2017.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

In areas with complex near-surface with irregular topography and structurally complex subsurface, there is much uncertainty in rms velocity estimation for prestack time migration. Whereas, interval velocity estimation for prestack depth migration is despairingly challenging. We often attribute the velocity uncertainty to various factors, including strong to severe lateral velocity variations, heterogeneity, anisotropy, mode conversion, and three-dimensional behavior of complex structures. Nevertheless, it is not easy to identify the cause of and account for the uncertainty as it often is a combination of the various factors. And the analyst struggles with much difficulty when estimating a velocity field whether it is for prestack time or depth migration.

Velocity uncertainty invariably gives rise to erroneously high or low migration velocities, which then causes two problems with prestack migration: (1) we fail to preserve reflector amplitudes, and (2) we also fail to position the reflectors correctly and focus diffractions to their apexes. We may choose to solve both problems simultaneously as we currently attempt to do with prestack migration workflows or we may choose to solve them one after the other as was done in the 1980s and 1990s by workflows that included Dip-Moveout (DMO) correction. The quality of image-gathers associated with prestack migration may not be adequate for velocity updating and thus may or may not warrant the simultaneous solution. In areas with irregular topography, complex near-surface, and complex subsurface, it may not. What then?

This disclosure proposes a workflow, applicable to both 2-D and 3-D seismic data, to solve the two problems with prestack time migration one after the other. The workflow is based on synthesis of a zero-offset wavefield to capture and preserve all reflections and diffractions, followed by zero-offset time migration.

CONCLUSION

The proposed i-cube workflow essentially involves a transformation from the observation domain (field records) to the zero-offset domain (demigration cube) to preserve reflections and diffractions. Rather than struggling to eliminate the uncertainty in velocity estimation for prestack time migration (PSTM) completely—an impossible task, specifically, in areas with complex near-surface and irregular topography and structurally complex subsurface, the i-cube workflow circumvents the velocity uncertainty. Because events in the zero-offset volume (demigration cube) are stationary both in time and space, we can sum over the velocity axis to obtain a composite (synthesized) zero-offset wavefield so as to preserve all events contained in the volume and avoid committing ourselves inadvertently to a velocity field which most likely would have some uncertainty. The resulting synthesized zero-offset wavefield can then be migrated by poststack time migration. The resulting image would have all the events, albeit some may be mispositioned because of velocity errors. The poststack time migration, however, can be repeated using a revised rms velocity field to position the events correctly. If, on the other hand, an rms velocity field with much uncertainty is used for PSTM, the resulting image not only would have mispositioned events but also some events with incomplete focusing or missing altogether. To remedy both the problems of event mispositioning, incomplete focusing and missing events, velocity field would have to be updated and PSTM would have to be repeated—a formidably time-consuming and resource-driven exercise, especially in case of 3-D imaging. In contrast, the proposed i-cube workflow produces a synthesized zero-offset wavefield and only requires poststack time migration that can be repeated at much less cost.

ACKNOWLEDGEMENT

I thank the owner of the field data, who requested to be anonymous, for permission to present the case study.

REFERENCES

Beasley, C. J. and Klotz, R., 1992, Equalization of DMO for irregular spatial sampling: 58th Ann. Internat. Mtg., Soc. Expl. Geophys., Expanded Abstracts, 970-973.

Canales, L., 1984, Random noise reduction: 54th Ann. Internat. Mtg., Soc. Expl. Geophys., Expanded Abstracts, 525.

Deregowski, S. M., 1982, Dip-moveout and reflector-point dispersal: Geophys. Prosp., 30, 318-322.

Fowler, P., 1984, Velocity-independent imaging of seismic reflectors: 54th Ann. Internat. Mtg., Soc. Explor. Geophys., Expanded Abstracts, 383-385.

Hale, D., 1984, Dip moveout by Fourier transform: Geophysics, 49, 741-757.

Hampson, D., 1987, The discrete Radon transform: A new tool for image enhancement and noise suppression: 57th Ann. Internat. Mtg., Soc. Expl. Geophys., Expanded Abstracts, 141-143.

Landa, E., 2013, Quantum seismic imaging, J. of Seismic Expl., 22, 295-310.

Landa, E., S. Fomel, and T. J. Moser, 2006, path-integral seismic imaging, Geophys. Pros., 54, 491-503.

Levin, F. K., 1971, Apparent velocity from dipping interface reflections: Geophysics, 36, 510-516.

Ronen, J. and Claerbout, J. F., 1985, Surface-consistent residual statics estimation by stack-power maximization: Geophysics, 50, 2759-2767.

Schleicher, J. and J. Costa, 2009, Migration velocity analysis by double-path integral migration, Geophysics, (74) 6, WCA225-231.

Sherwood, J. W. C., Schultz, P. S., and Judson, D. R., 1978, Equalizing the stacking velocities of dipping events via Devilish: Presented at the 48th Ann. Internat. Soc. Expl. Geophys. Mtg.

Shurtleff, R., 1984, An F-K procedure for prestack migration and velocity analysis: Presented at the 46th Ann. Mtg. European Asn. Expl. Geophys.

Trickett, R. S., 2005, F-xy eigenimage noise suppression, Geophysics, (68) 2, 755-759.

Yilmaz, O. and Claerbout, J. F., 1980, Prestack partial migration: Geophysics, 45, 1753-1777.

Yilmaz, O., 2001, Seismic Data Analysis: Processing, Inversion, and Interpretation of Seismic Data, Soc. Expl. Geophys. Tulsa, Okla.

Yilmaz, O., 2015, Engineering Seismology: with Applications to Geotechnical Investigations, Soc. Expl. Geophys. Tulsa, Okla.

Zhang, J., and M. N. Toksoz, 1998, Nonlinear refraction traveltime tomography: Geophysics, 63, 1726{1737, http://dx.doi.org/10.1190/1.1444468.

None of the known inventions and patents, taken either singularly or in combination, is seen to describe the instant disclosure as claimed.

BRIEF SUMMARY OF THE INVENTION

A zero-offset wavefield synthesis workflow to calculate a synthesized zero-offset wavefield output without the commitment to an rms velocity field output to circumvent velocity uncertainty. Comprising calculating a migration cube output with a migration cube procedure by estimating a model for the near-surface by nonlinear traveltime inversion applied to first-arrival times picked from shot gathers and calculate the medium- to long-wavelength shot-receiver statics, applying shot-receiver statics and an appropriate single-channel signal processing sequence to shot records, estimating a short-wavelength shot-receiver residual statics based on stack-power optimization, apply said short-wavelength shot-receiver residual statics to moveout-corrected CMP gathers, performing multichannel signal enhancement in the CMP domain, returning to a shot-receiver domain and perform additional multichannel signal enhancement to further attenuate coherent linear noise and random noise, performing prestack time migration of all shot gathers using a range of constant velocities, and obtaining a set of a velocity panels that form said migration cube output. Rendering a demigration cube output from said migration cube output with a demigration cube calculation. Rendering said synthesized zero-offset wavefield output from said demigration cube output with a zero-offset wavefield synthesis procedure.

Next, a zero-offset wavefield synthesis workflow to calculate a synthesized zero-offset wavefield output without the commitment to an rms velocity field output to circumvent velocity uncertainty. Comprising calculating a migration cube output with a migration cube procedure by estimating a model for the near-surface by nonlinear traveltime inversion applied to first-arrival times picked from shot gathers and calculate the medium- to long-wavelength shot-receiver statics, applying shot-receiver statics and an appropriate single-channel signal processing sequence to shot records, estimating a short-wavelength shot-receiver residual statics based on stack-power optimization, apply said short-wavelength shot-receiver residual statics to moveout-corrected CMP gathers, performing multichannel signal enhancement in the CMP domain, returning to the shot-receiver domain and perform additional multichannel signal enhancement to further attenuate coherent linear noise and random noise, performing prestack time migration of all shot gathers using a range of constant velocities, and obtaining a set of a velocity panels that form said migration cube output. Rendering a demigration cube output from said migration cube output with a demigration cube calculation. Rendering said synthesized zero-offset wavefield output from said demigration cube output with a zero-offset wavefield synthesis procedure. Said demigration cube output comprises an unmigrated volume that contains all reflections and diffractions that are present in the signal-processed shot gathers. Estimating said rms velocity field output by limiting estimates within the bounds of time migration. Said rms velocity field output comprises a one or more lateral velocity variations.

Finally, a zero-offset wavefield synthesis workflow to calculate a synthesized zero-offset wavefield output without the commitment to an rms velocity field output to circumvent velocity uncertainty. Comprising calculating a migration cube output with a migration cube procedure by estimating a model for the near-surface by nonlinear traveltime inversion applied to first-arrival times picked from shot gathers and calculate the medium- to long-wavelength shot-receiver statics, applying shot-receiver statics and an appropriate single-channel signal processing sequence to shot records, estimating a short-wavelength shot-receiver residual statics based on stack-power optimization, apply said short-wavelength shot-receiver residual statics to moveout-corrected CMP gathers, performing multichannel signal enhancement in the CMP domain, returning to the shot-receiver domain and perform additional multichannel signal enhancement to further attenuate coherent linear noise and random noise, performing prestack time migration of all shot gathers using a range of constant velocities, and obtaining a set of a velocity panels that form said migration cube output. Rendering a demigration cube output from said migration cube output with a demigration cube calculation. Rendering said synthesized zero-offset wavefield output from said demigration cube output with a zero-offset wavefield synthesis procedure. Performing multichannel signal processing to each of said velocity panels of said migration cube procedure to increase signal coherency. Said migration cube output comprises image volume in (V, X, T) coordinates; wherein said V comprises an rms velocity, said X comprises a midpoint, and said T comprises an event time after migration. Demigrating each of said velocity panels within said migration cube output using said range of constant velocities. Creating said demigration cube output.

DETAILED DESCRIPTION OF THE INVENTION

Figure 1:
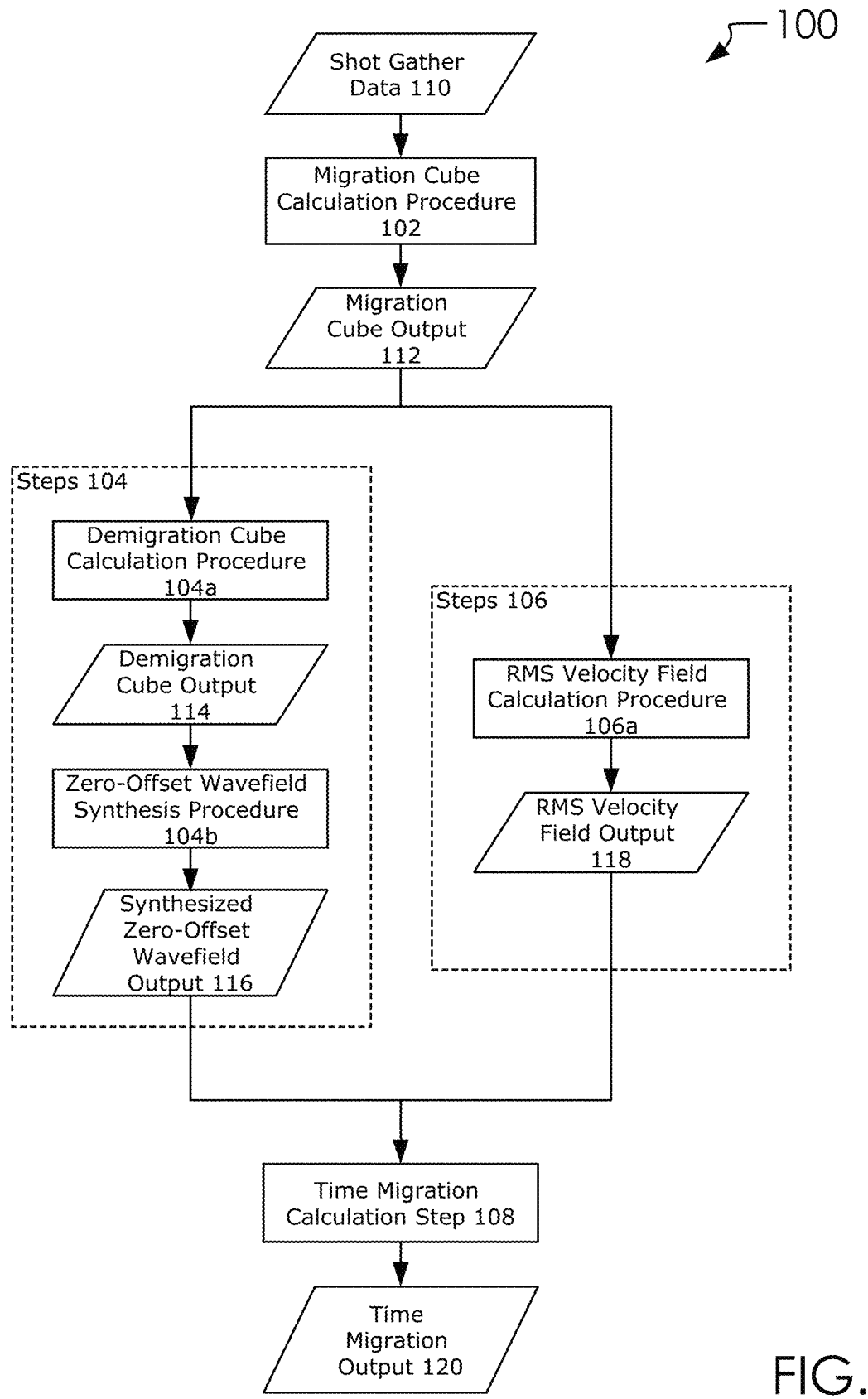
FIG. 1 illustrates a flow chart view of said zero-offset wavefield synthesis workflow 100.

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

These parts are illustrated in the figures and discussed below:

a zero-offset wavefield synthesis workflow 100
a migration cube procedure 102
a demigration cube procedure 104
a demigration cube calculation 104a
a zero-offset wavefield synthesis procedure 104b
an rms velocity field calculation procedure 106
an rms velocity field calculation 106a
a time migration calculation 108
a shot gather data 110
a migration cube output 112
a demigration cube output 114
a synthesized zero-offset wavefield output 116
an rms velocity field output 118
a time migration output 120
a prestack time migration diagram 200
a one or more measurement points 202
a measurement point A 202a
a measurement point B 202b
a prestack time migration output 204
a semblance at A diagram 300
a semblance at B diagram 302
a CIP gather at A diagram 304
a CIP gather at B diagram 306
a migration-cube stack diagram 400
a migration-cube stack output 402
a calculations diagram 500
a workflow equations 502
a first equation 502a
a second equation 502b
a third equation 502c
a fourth equation 502d
a fifth equation 502e
a workflow diagram 600
a velocity panels 602
a zero-offset wavefield diagram 700
a zero-offset wavefield output 702
a zero-offset wavefield time migration diagram 800
a zero-offset wavefield time migration output 802
a zero-offset wavefield depth migration diagram 900
a zero-offset wavefield depth migration output 902
a one or more steps 1000
a first step 1000a
a second step 1000b
a third step 1000c
a fourth step 1000d
a fifth step 1000e
a sixth step 1000f
a seventh step 1000g
an eighth step 1000h
a computer implementation 1100
a one or more computers 1102
a one or more processors 1104
a memory 1106
a workflow application 1108
a communication hardware 1110

FIG. 1 illustrates a flow chart view of said zero-offset wavefield synthesis workflow 100.

In one embodiment, said zero-offset wavefield synthesis workflow 100 can comprise said migration cube procedure 102, said demigration cube procedure 104, said rms velocity field calculation procedure 106, said time migration calculation 108, said shot gather data 110, said migration cube output 112, said demigration cube output 114, said synthesized zero-offset wavefield output 116, said rms velocity field output 118 and said time migration output 120.

In one embodiment, said demigration cube procedure 104 can comprise said demigration cube calculation 104a and said zero-offset wavefield synthesis procedure 104b.

In one embodiment, said rms velocity field calculation procedure 106 can comprise said rms velocity field calculation 106a.

The steps in FIG. 1 can comprise an overview of the current disclosure.

In one embodiment, migration cube procedure 102 can comprise a series of steps known in the art and described herein. A detailed walk-through of said migration cube procedure 102 can be found in FIG. 10 and in its introduction.

First, migration cube procedure 102 can comprise estimating a model for the near-surface by nonlinear traveltime inversion applied to first-arrival times picked from shot gathers and calculate the medium- to long-wavelength shot-receiver statics (Zhang and Toksoz, 1998; Yilmaz, 2015).

Next, migration cube procedure 102 can comprise applying shot-receiver statics and an appropriate single-channel signal processing sequence to shot records (Yilmaz, 2001). This sequence, aside from geometric spreading correction, may include time-variant spectral whitening to account for the signal non-stationarity and flatten the spectrum within the signal passband to reduce the strength of the large-amplitude, low-frequency surface waves; and predictive deconvolution to shape the spectrum to a bell curve that is slightly asymmetric in favor of the low-frequency side of the signal band with its peak coincident with the dominant signal frequency.

Then, migration cube procedure 102 can comprise estimating short-wavelength shot-receiver residual statics based on stack-power optimization and apply them to moveout-corrected CMP gathers (Ronen and Claerbout, 1985; Yilmaz, 2001).

Now, migration cube procedure 102 can comprise performing multichannel signal enhancement in the CMP domain: Radon transform to attenuate multiples, coherent linear noise, and random noise (Hampson, 1987; Yilmaz, 2001).

Thereafter, migration cube procedure 102 can comprise returning to the shot-receiver domain and, if required, perform additional multichannel signal enhancement to further attenuate coherent linear noise and random noise (Canales, 1984; Yilmaz, 2001; Trickett, 2005).

Then, migration cube procedure 102 can comprise performing prestack time migration of all shot gathers using a range of constant velocities and obtain a set of image panels that form an image volume in (V, X, T) coordinates, where V is the rms velocity, X is the midpoint, and T is the event time after migration. This image volume is referred to as migration cube (said migration cube procedure 102) (Shurtleff, 1984; Fowler, 1984; Yilmaz, 2001).

Said zero-offset wavefield synthesis workflow 100 can comprise receiving said shot gather data 110, calculating migration cube output 112, feeding said migration cube output 112 into demigration cube procedure 104 and rms velocity field calculation procedure 106, calculating synthesized zero-offset wavefield output 116 with demigration cube procedure 104 and rms velocity field output 118 with rms velocity field calculation procedure 106, and feeding synthesized zero-offset wavefield output 116 and rms velocity field output 118 into time migration calculation 108 and calculating time migration output 120 with time migration calculation 108.

Figure 2:
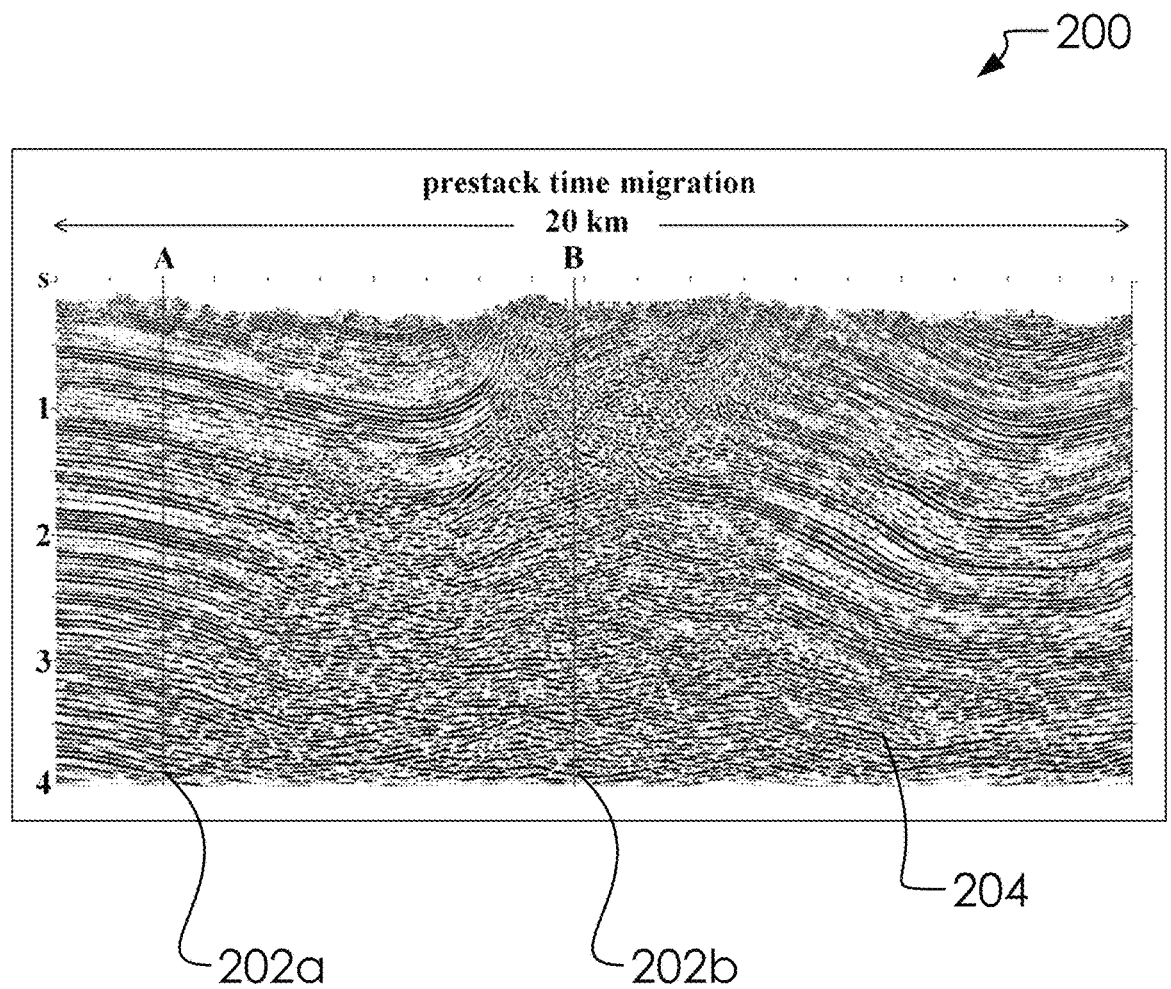
FIG. 2 illustrates view of prestack time migration diagram 200.

FIG. 2 illustrates view of prestack time migration diagram 200.

In one embodiment, said prestack time migration diagram 200 can comprise said one or more measurement points 202.

In one embodiment, said one or more measurement points 202 can comprise said measurement point A 202a and said measurement point B 202b.

In one embodiment, said zero-offset wavefield synthesis workflow 100 can comprise said prestack time migration diagram 200 and said prestack time migration output 204.

In one embodiment, prestack time migration diagram 200 can comprise an image obtained by prestack time migration (PSTM) from a thrust belt. The rms velocity semblance spectra and common-image-point (CIP) gathers at one or more measurement points 202 are shown in detail on the following page of this disclosure.

Said prestack time migration diagram 200 shows an image section obtained by PSTM using an rms velocity field (as in said rms velocity field output 118) that was constructed by velocity picking from the migration cube obtained by PSTM of shot gathers using a range constant velocities from a floating datum.

Figure 3A:
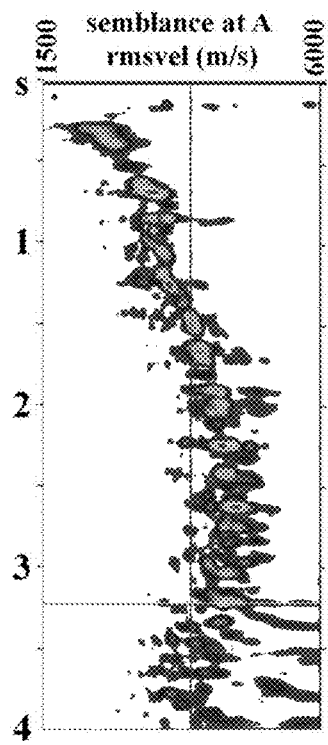
FIG. 3A illustrates said semblance at A diagram 300.
Figure 3B:
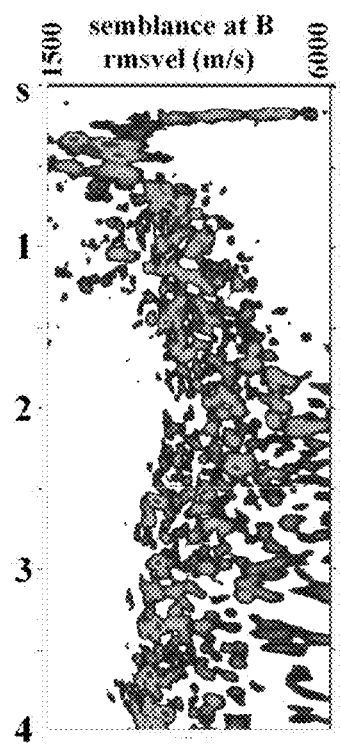
FIG. 3B illustrates said semblance at B diagram 302.
Figure 3C:
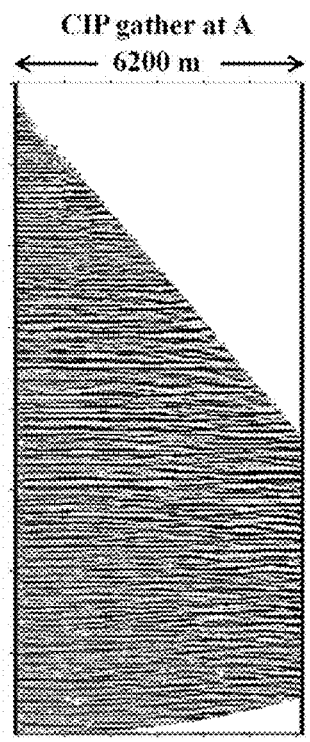
FIG. 3C illustrates said CIP gather at A diagram 304.
Figure 3D:
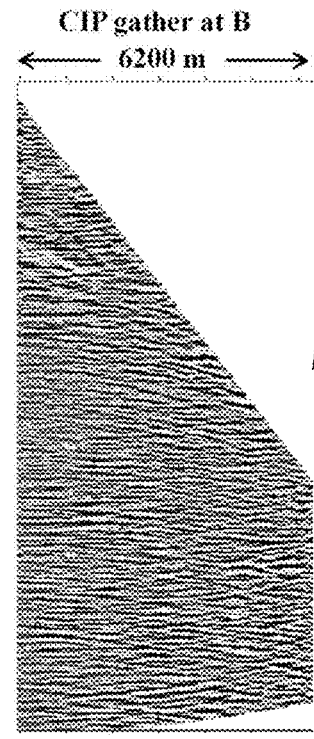
FIG. 3D illustrates said CIP gather at B diagram 306.

FIG. 3A illustrates said semblance at A diagram 300.
FIG. 3B illustrates said semblance at B diagram 302.
FIG. 3C illustrates said CIP gather at A diagram 304.
FIG. 3D illustrates said CIP gather at B diagram 306.

In one embodiment, said prestack time migration diagram 200 can comprise said semblance at A diagram 300, said semblance at B diagram 302, said CIP gather at A diagram 304, said CIP gather at B diagram 306 and said CIP gather at B diagram 306.

FIGS. 3A-3D can comprise rms velocity semblance spectra (semblance at A diagram 300 and semblance at B diagram 302), and CIP gathers (CIP gather at A diagram 304 and CIP gather at B diagram 306).

Turning to a comparison of semblance at A diagram 300 and semblance at B diagram 302, semblance at A diagram 300 can exhibit a distinctive set of peaks that allow picking a velocity function unambiguously, whereas the semblance spectrum at semblance at B diagram 302 can exhibit a multiplicity of peaks that can give rise to uncertainty in velocity picking.

The structural complexity at the central portion of the line observed in prestack time migration diagram 200 is indicative of the difficulties in velocity picking. A further evidence of the troubling nature of velocity uncertainty is provided by the Common-Image-Point (CIP) gathers associated with PSTM (CIP gather at A diagram 304 and CIP gather at B diagram 306).

The CIP gather at CIP gather at A diagram 304 can exhibit flat events that confirm the accuracy of the rms velocity field used for PSTM, whereas CIP gather at B diagram 306 can exhibit highly complex and interfering events—again indicative of the velocity uncertainty within the structurally complex portion of the line. This CIP gather not only can be a manifestation of the structural complexity resulting in a poor image (said prestack time migration diagram 200), but also is practically unusable for velocity update based on flatness of events, nor can it be used for verification of the accuracy of the rms velocity field used for PSTM.

This leads us to the following question: Can we circumvent the velocity uncertainty rather than hopelessly struggle to eliminate it and yet produce an image in time better than obtained by conventional PSTM based on a velocity field with much uncertainty?

This disclosure presents said zero-offset wavefield synthesis workflow 100, also referred to as "i-cube" for brevity, that provides an answer to this question in the affirmative.

In one embodiment, zero-offset wavefield synthesis workflow 100 can include construction of a migration cube by prestack time migration of shot gathers using a range of constant velocities. This migration cube can be used to pick rms velocities for prestack time migration. Yet, the multiplicity of semblance peaks associated with the migration cube remains to be perilous. We can sum the image panels within the migration cube over the velocity axis to obtain a composite image in time so as to preserve all events in the migration cube and avoid committing ourselves inadvertently to a velocity field which most likely would have some uncertainty.

Figure 4:
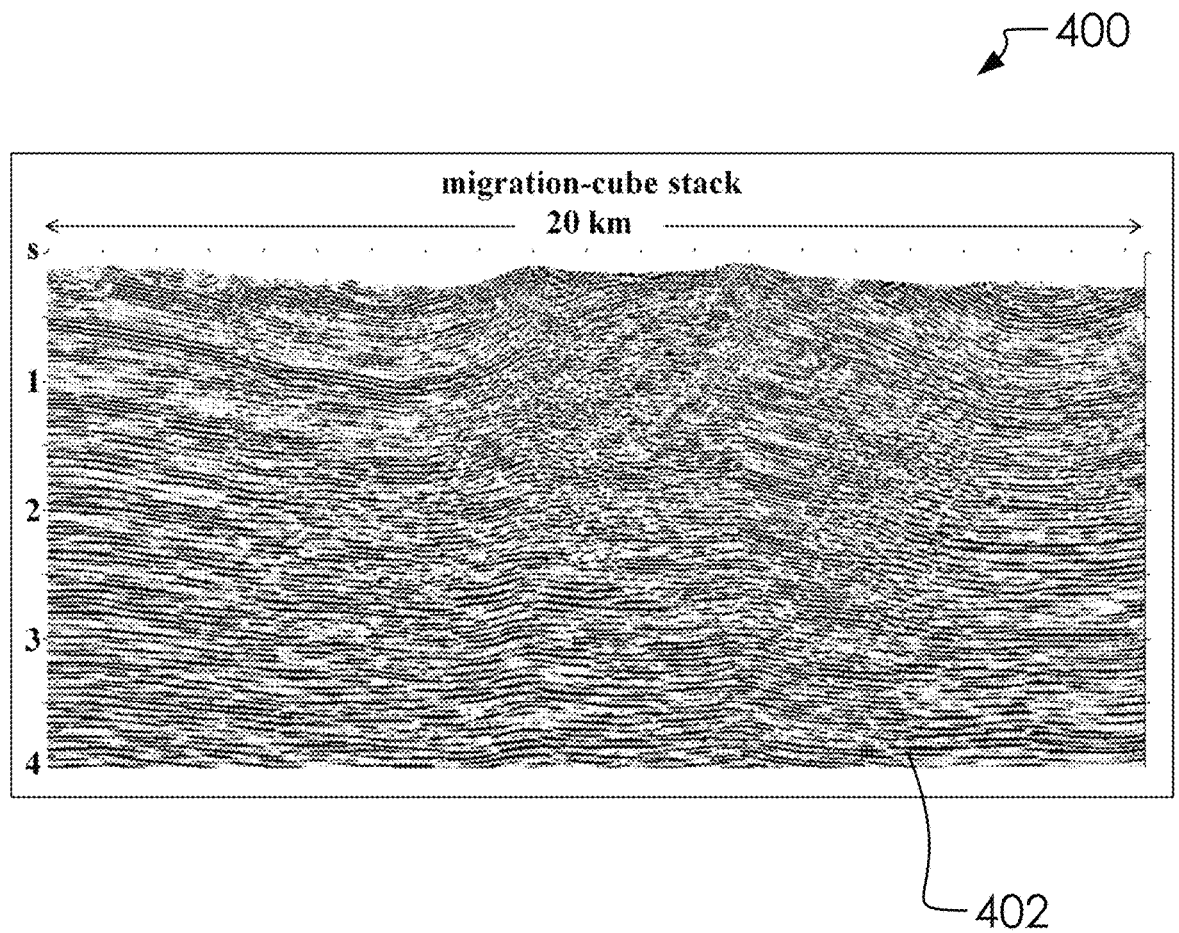
FIG. 4 illustrates said migration-cube stack diagram 400.

FIG. 4 illustrates said migration-cube stack diagram 400.

In one embodiment, said zero-offset wavefield synthesis workflow 100 can comprise said migration-cube stack output 402.

In one embodiment, migration-cube stack diagram 400 can comprise a stack of the migration-cube panels.

For analysis, one might begin with noting the smearing of the dipping events as a result of their nonstationary behavior. This summation strategy, however, fails because dipping events and diffractions within the migration cube are not stationary in time and space. As a result, they are not preserved in the composite image (migration-cube stack diagram 400).

To meet the requirement for non-stationarity, we first apply multichannel signal processing to each of the (X, T) velocity panels of the migration cube to increase signal coherency and unmigrate each of the (X, T) velocity panels of the migration cube, then apply Radon transform to each of the velocity gathers in (V, T) coordinates to reduce the horizontal smearing of amplitudes associated with finite cable length and discrete sampling along the offset axis (demigration cube calculation 104a) and obtain the demigration cube (demigration cube output 114), and finally sum over the velocity axis (zero-offset wavefield synthesis procedure 104b). The resulting composite unmigrated section actually is equivalent to a zero-offset wavefield (synthesized zero-offset wavefield output 116), which preserves diffractions and all reflections with conflicting dips. The final step in the workflow is poststack time migration of the synthesized zero-offset wavefield (said time migration output 120).

This disclosure shall demonstrate said zero-offset wavefield synthesis workflow 100 (the i-cube workflow) using a field data set from a thrust belt.

Figure 5:
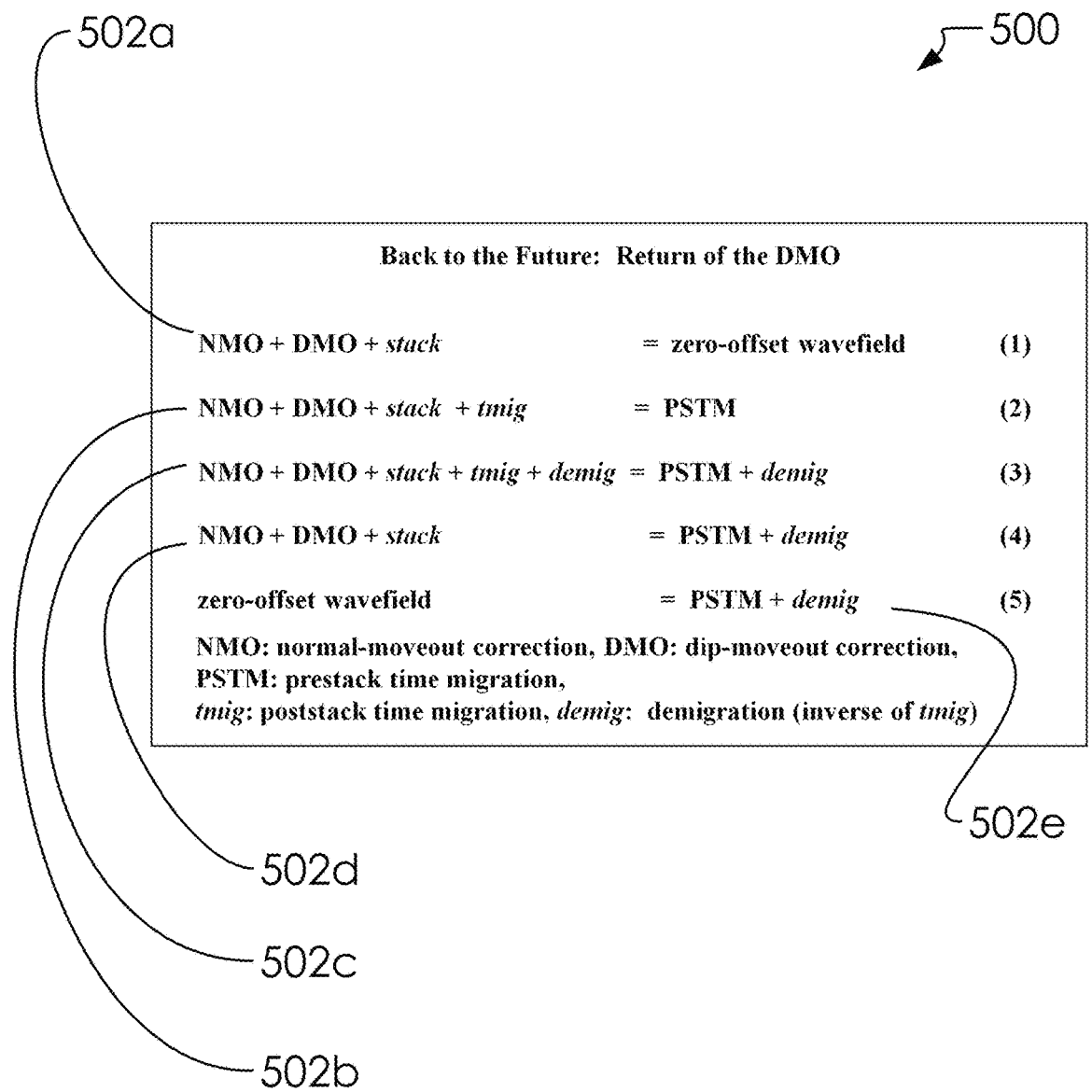
FIG. 5 illustrates said calculations diagram 500.

FIG. 5 illustrates said calculations diagram 500.

In one embodiment, said calculations diagram 500 can comprise said workflow equations 502.

In one embodiment, said workflow equations 502 can comprise said first equation 502*a*, said second equation 502*b*, said third equation 502*c*, said fourth equation 502*d* and said fifth equation 502*e*.

In one embodiment, said zero-offset wavefield synthesis workflow 100 can comprise said calculations diagram 500.

Said calculations diagram 500 is labeled "Back to the future: return of the DMO". Accordingly, zero-offset wavefield synthesis workflow 100 may be considered as being inspired by the DMO workflow.

In the presence of conflicting dips with different stacking velocities, conventional CMP stack is not equivalent to a zero-offset wavefield.

Within the context of subsurface imaging in time, this is the compelling reason for doing prestack time migration (PSTM) in lieu of poststack time migration. Aside from the fact that the former also is used for rms velocity estimation and updating based on the flatness of events in CIP gathers associated with PSTM. Prior to the age of PSTM, a workflow for time migration developed in the 1980s included Dip-Moveout (DMO) correction to correct for the dip and source-receiver azimuth effects on stacking velocities (Levin, 1971; Sherwood et al., 1978; Yilmaz and Claerbout, 1980; Deregowski, 1982; Hale, 1984; Beasley, 1992; Yilmaz, 2001). With the increase in computational power, this resource-intensive workflow with multiple stages of velocity analysis soon was abandoned and replaced in the 1990s by the familiar PSTM workflows.

Said zero-offset wavefield synthesis workflow 100 is based on synthesis of a zero-offset wavefield to capture and preserve all reflections and diffractions, followed by zero-offset time migration.

Nevertheless, we can draw a lesson from DMO processing to devise a workflow for PSTM that circumvents velocity uncertainty.

Turning now to workflow equations 502, first consider that by applying DMO correction to NMO-corrected CMP gathers and stacking, we obtain a close approximation to a zero-offset wavefield, which by definition includes all reflections and diffractions as symbolically described by first equation 502*a*. The image in time obtained by the DMO workflow essentially is equivalent to the image obtained by PSTM, provided lateral velocity variations are within the bounds of time migration. This statement is symbolically expressed by second equation 502*b*, where tmig stands for poststack time migration. Add demig to both sides of this equation to get said third equation 502*c*, where demig stands for demigration—in this case, inverse of tmig. This means that the terms tmig and demig on the left-side of said third equation 502*c* cancel each other, and we obtain said fourth equation 502*d*. Note that the left-side of said fourth equation 502*d* yields the zero-offset wavefield as in said fifth equation 502*e*.

Figure 6:
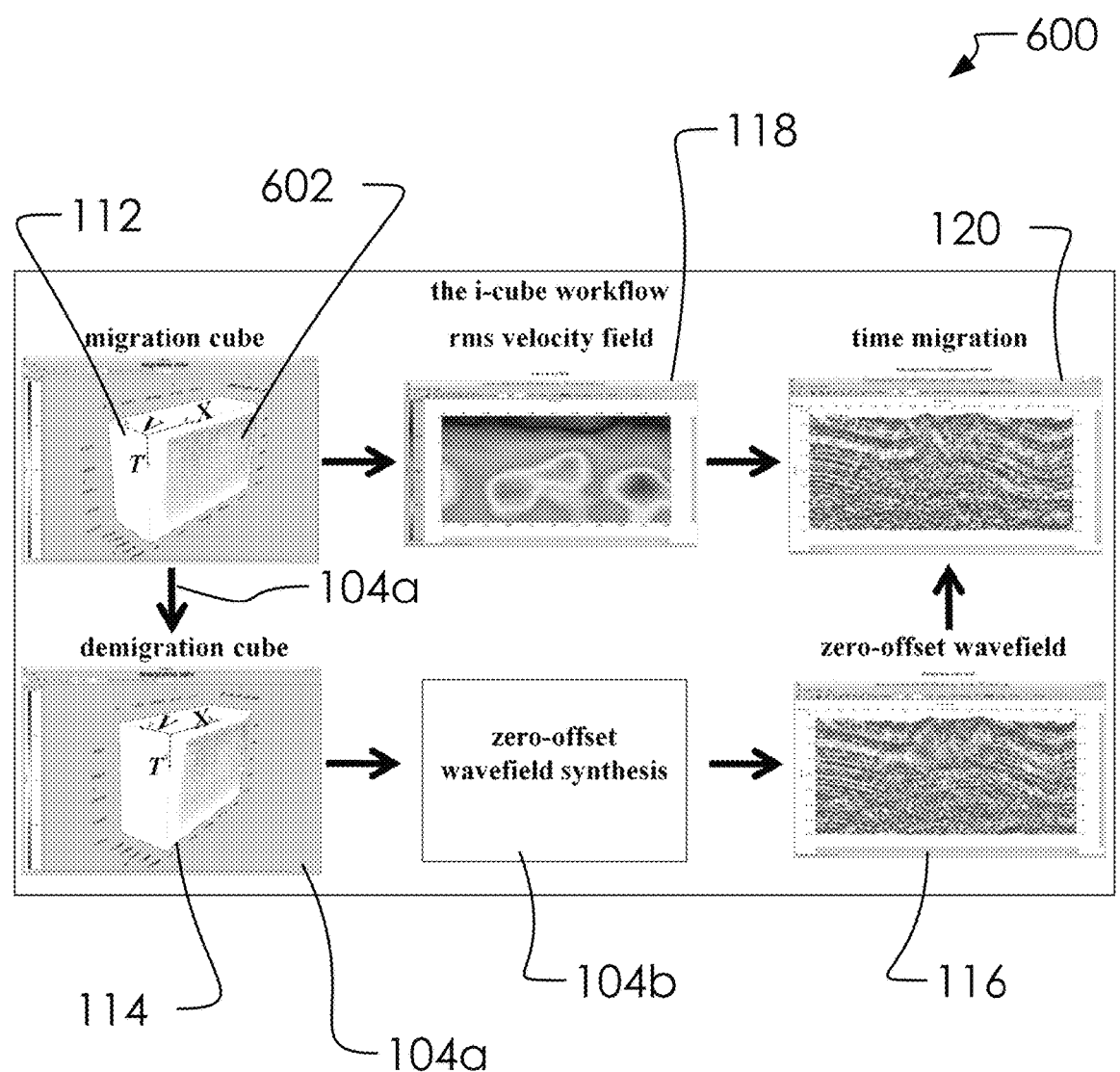
FIG. 6 illustrates said workflow diagram 600.

FIG. 6 illustrates said workflow diagram 600.

In one embodiment, said migration cube output 112 can comprise said velocity panels 602.

Said workflow diagram 600 can comprise a graphical representation of zero-offset wavefield synthesis workflow 100.

Said migration cube output 112 can comprise velocity panels 602; wherein, zero-offset wavefield synthesis workflow 100 can perform multichannel signal processing to each among said velocity panels 602 to increase signal coherency. Said velocity panels 602 can comprise the X and T vectors of said migration cube output 112.

In one embodiment, migration cube output 112 comprises image volume in (V, X, T) coordinates, where V can comprise the rms velocity, X can comprise the midpoint, and T can comprise the event time after migration.

Figure 7:
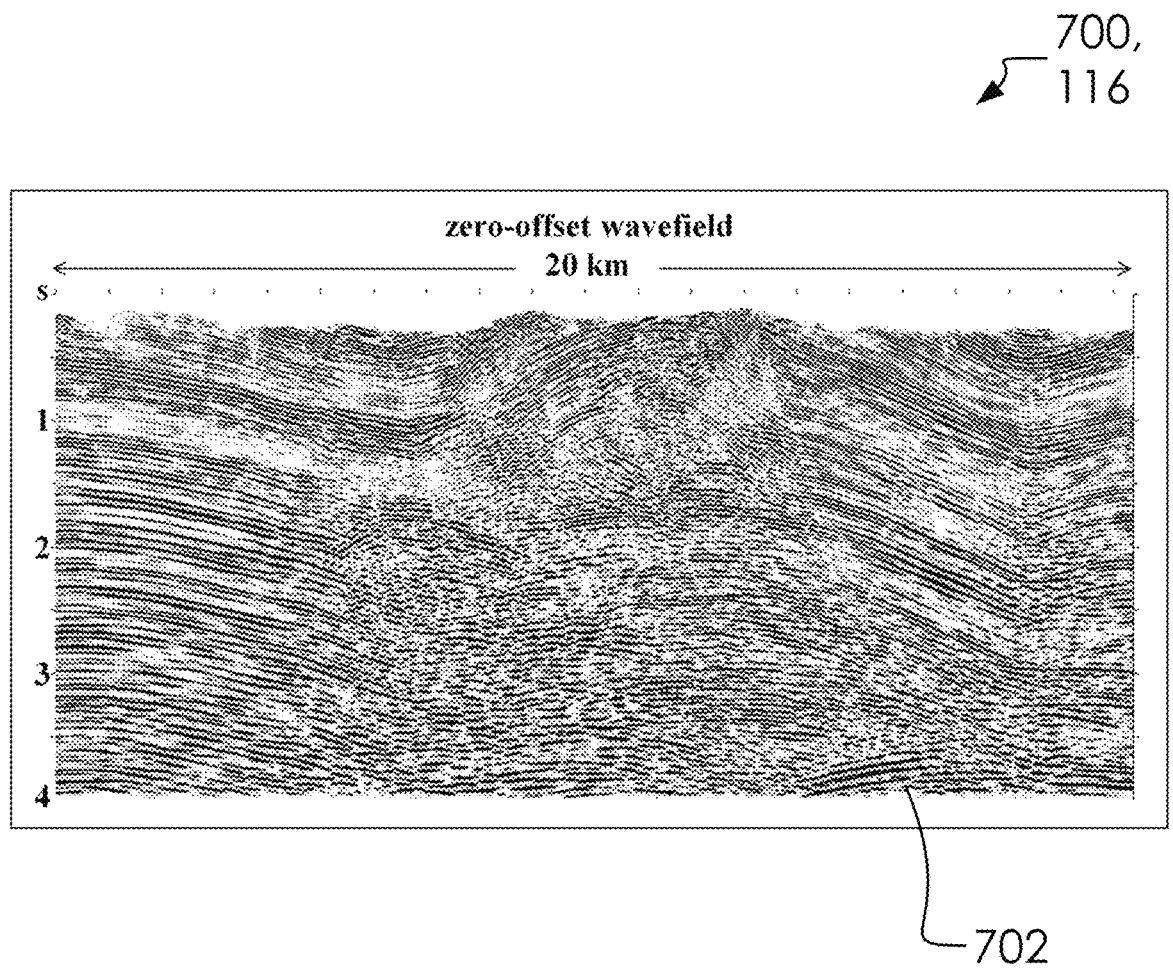
FIG. 7 illustrates said zero-offset wavefield diagram 700.

FIG. 7 illustrates said zero-offset wavefield diagram 700.

In one embodiment, said zero-offset wavefield diagram 700 can comprise said zero-offset wavefield output 702.

In one embodiment, said workflow diagram 600 can comprise said zero-offset wavefield diagram 700.

Said zero-offset wavefield diagram 700 represent data rendered from zero-offset wavefield synthesis workflow 100. Said zero-offset wavefield diagram 700 can be obtained by stacking the panels of the demigration cube (said zero-offset wavefield synthesis procedure 104*b*).

Figure 8:
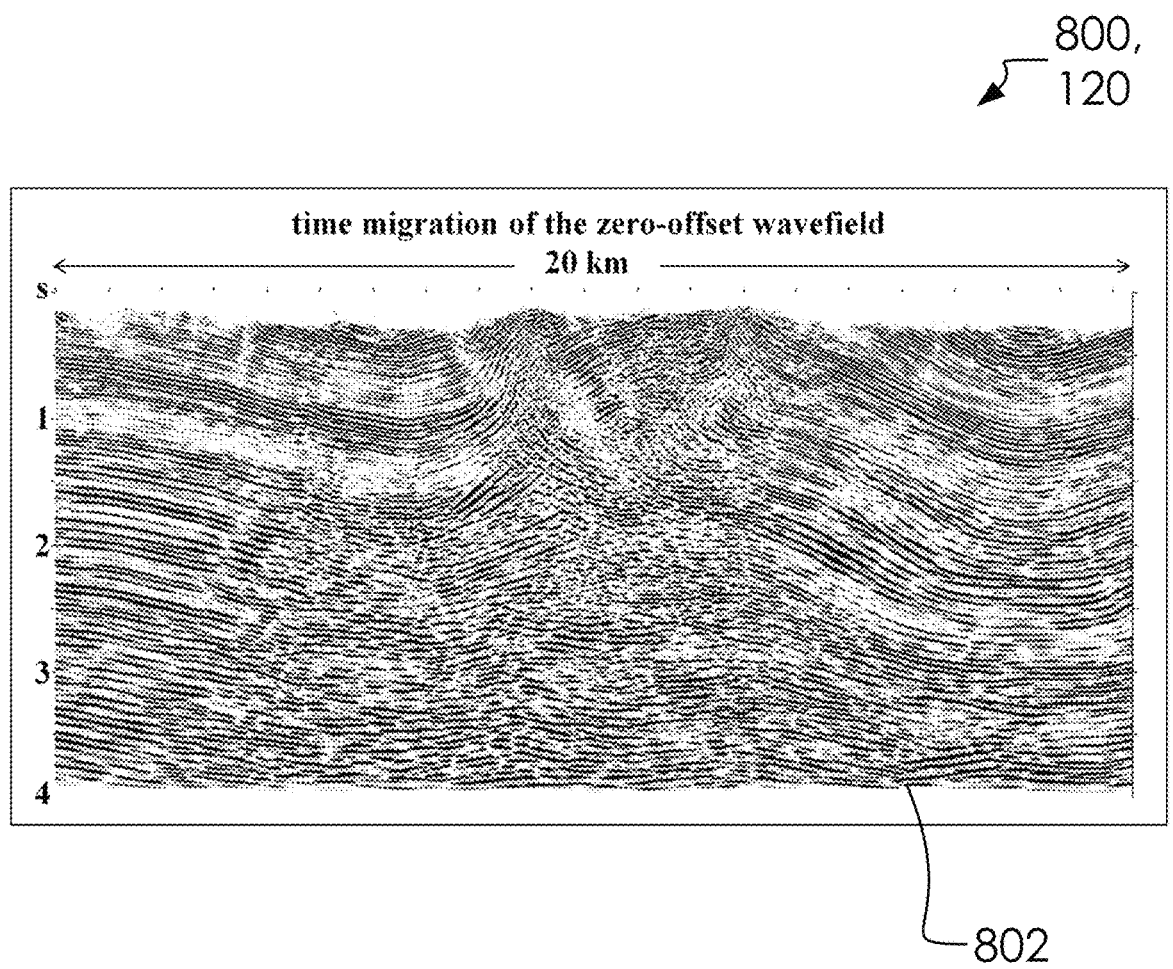
FIG. 8 illustrates said zero-offset wavefield time migration diagram 800.

FIG. 8 illustrates said zero-offset wavefield time migration diagram 800.

In one embodiment, said zero-offset wavefield time migration diagram 800 can comprise said zero-offset wavefield time migration output 802.

In one embodiment, said zero-offset wavefield synthesis workflow 100 can comprise said zero-offset wavefield time migration diagram 800.

Said zero-offset wavefield time migration diagram 800 can comprise poststack time migration of synthesized zero-offset wavefield output 116 of zero-offset wavefield synthesis workflow 100 and workflow diagram 600.

Said zero-offset wavefield time migration diagram 800 can comprise the principal image in time; further, zero-offset wavefield time migration diagram 800 can be used for structural interpretation.

For analysis, compare zero-offset wavefield time migration diagram 800 with prestack time migration diagram 200 (the image obtained by conventional PSTM), and note the significant improvement of the structural complexity in the central portion of the line.

Figure 9:
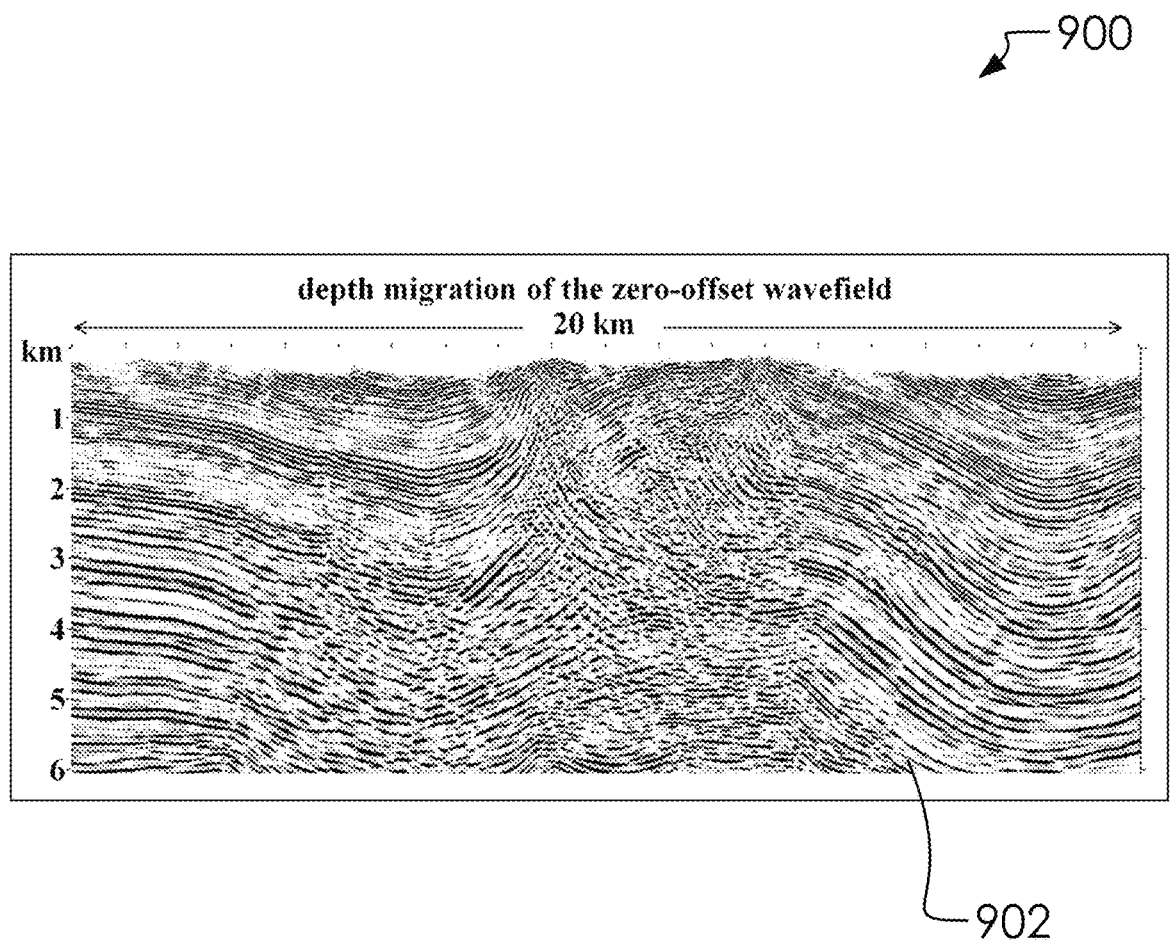
FIG. 9 illustrates said zero-offset wavefield depth migration diagram 900.

FIG. 9 illustrates said zero-offset wavefield depth migration diagram 900.

In one embodiment, said zero-offset wavefield depth migration diagram 900 can comprise said zero-offset wavefield depth migration output 902.

In one embodiment, said zero-offset wavefield synthesis workflow 100 can comprise said zero-offset wavefield depth migration diagram 900.

In one embodiment, said calculations diagram 500 can comprise said zero-offset wavefield depth migration output 902.

Said zero-offset wavefield depth migration diagram 900 can comprise a poststack depth migration of the synthesized zero-offset wavefield (said zero-offset wavefield diagram 700).

In one embodiment, zero-offset wavefield depth migration diagram 900 can comprise an auxiliary image in depth accompanying the principal image in time shown in said zero-offset wavefield time migration diagram 800 and can be used for structural interpretation.

Figure 10:
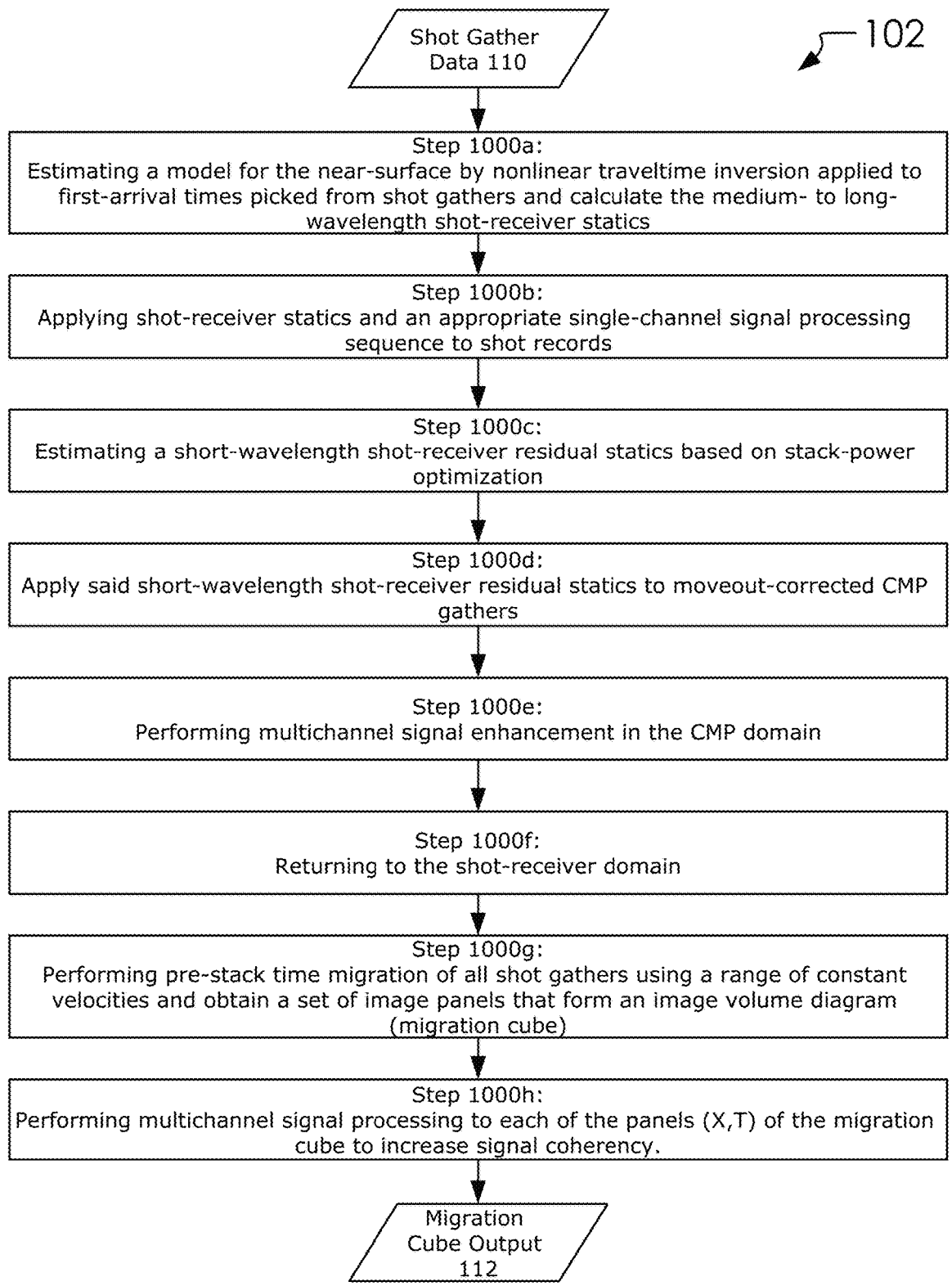
FIG. 10 illustrates a flow chart view of said migration cube procedure 102.

FIG. 10 illustrates a flow chart view of said migration cube procedure 102.

In one embodiment, said one or more steps 1000 can comprise said first step 1000*a*, said second step 1000*b*, said third step 1000*c*, said fourth step 1000*d*, said fifth step 1000*e*, said sixth step 1000*f*, said seventh step 1000*g* and said eighth step 1000*h*.

In one embodiment, said migration cube procedure 102 can comprise said one or more steps 1000.

Said migration cube procedure 102 can be illustrated as shown in one or more steps 1000.

Figure 11:
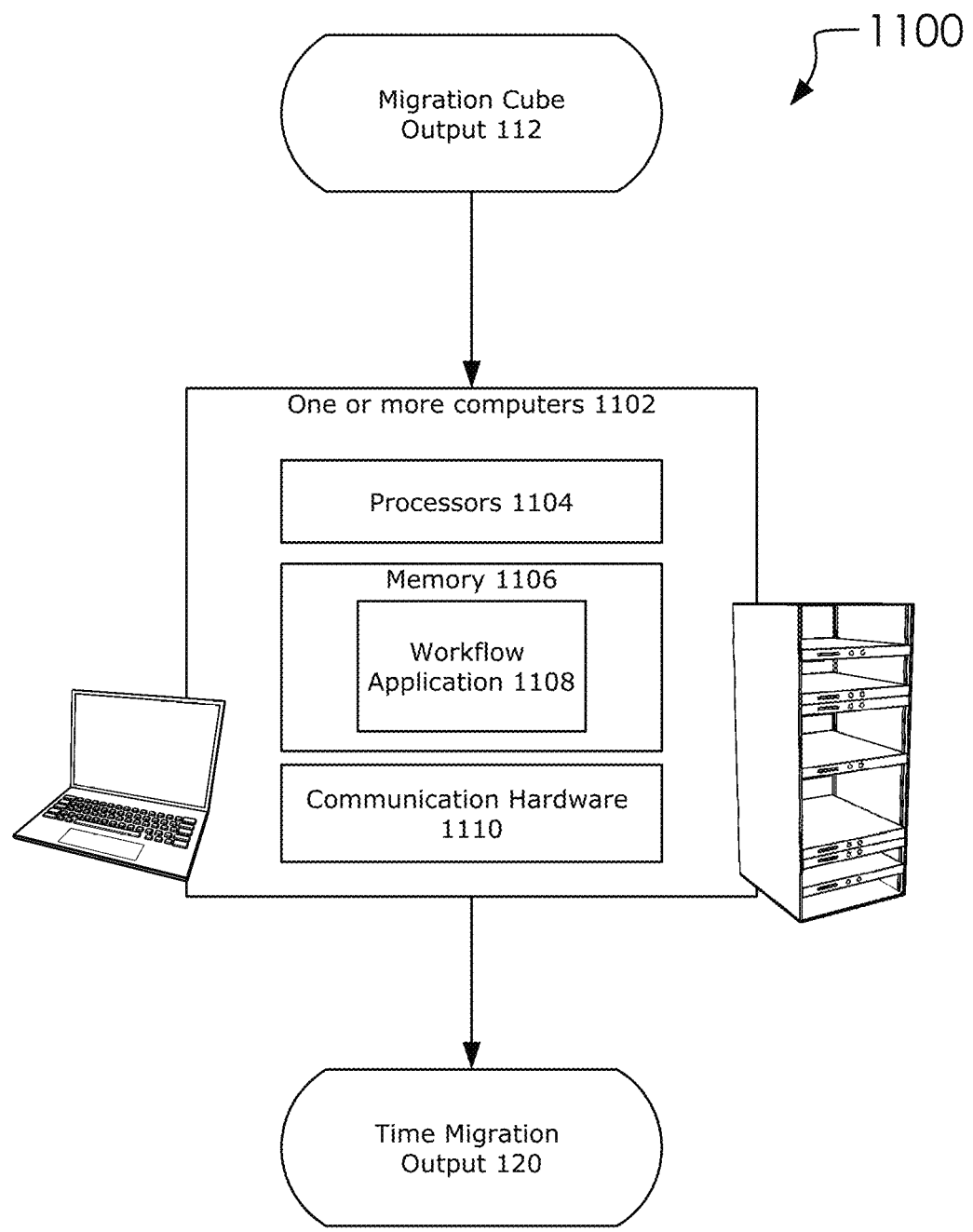
FIG. 11 illustrates a flow chart view of a computer implementation 1100 of said zero-offset wavefield synthesis workflow 100.

FIG. 11 illustrates a flow chart view of a computer implementation 1100 of said zero-offset wavefield synthesis workflow 100.

Said computer implementation 1100 can comprise said migration cube output 112 being input into a one or more computers 1102, a portion of which are configured to implement said zero-offset wavefield synthesis workflow 100. In one embodiment, said one or more computers 1102 can comprise a one or more processors 1104, a memory 1106 comprising a workflow application 1108, and a communication hardware 1110. In one embodiment, said workflow application 1108 can comprise code configured to receive said migration cube output 112 and/or said shot gather data 110, apply the steps outlined in said zero-offset wavefield synthesis workflow 100, and generate said synthesized zero-offset wavefield output 116 and/or said time migration output 120.

Said one or more computers 1102 can comprise laptops, desktops, servers, mobile devices or similar. In one embodiment, said one or more computers 1102 can comprise and operating system such as Linux.

Quoting from Yilmaz, 2001, the following can summarize the understanding in the art of the phrase "moveout-corrected CMP gathers": "The velocity field (FIGS. 1.5-12) is used in normal moveout (NMO) correction of CMP gathers. Based on the assumption that, in a CMP gather, reflection traveltimes as a function of offset follow hyperbolic trajectories, the process of NMO correction removes the moveout effect on traveltimes."

Likewise quoting from Yilmaz 2001, the following can summarize the term "near-surface" as known in the art: "Near-surface geophysics is the use of geophysical methods to investigate small-scale features in the shallow (tens of meters) subsurface. It is closely related to applied geophysics or exploration geophysics. Methods used include seismic refraction and reflection, gravity, magnetic, electric, and electromagnetic methods. Many of these methods were developed for oil and mineral exploration but are now used for a great variety of applications, including archaeology, environmental science, forensic science, military intelligence, geotechnical investigation, treasure hunting, and hydrogeology. In addition to the practical applications, near-surface geophysics includes the study of biogeochemical cycles." Accordingly, "near-surface" is understood to mean the layer just below the surface of the earth and above the subsurface layers of rocks. The near-surface is composed of highly heterogeneous, unconsolidated earth material. To image the subsurface, you need to remove the deleterious effect of the near-surface complexity.

In one embodiment, references to said short wavelength can comprise a first wavelength; said medium wavelength can comprise a second wavelength; and said long wavelength can comprise a third wavelength. In one embodiment, said third wavelength is longer than said second wavelength, and said second wavelength is longer than said first wavelength. Further, in one embodiment, said first wavelength shot-receiver residual statics characterize said first wavelength, said second wavelength shot-receiver statics characterize said second wavelength, and said third wavelength shot-receiver statics characterize said third wavelength.

In summary, the following comprises an overview of the disclosure with reference to all the figures.

A zero-offset wavefield synthesis workflow 100 to calculate a synthesized zero-offset wavefield output 116 without the commitment to an rms velocity field output 118 to circumvent velocity uncertainty. Comprising calculating a migration cube output 112 with a migration cube procedure 102 by estimating a model for the near-surface by nonlinear traveltime inversion applied to first-arrival times picked from shot gathers and calculate the medium- to long-wavelength shot-receiver statics, applying shot-receiver statics and an appropriate single-channel signal processing sequence to shot records, estimating a short-wavelength shot-receiver residual statics based on stack-power optimization, apply said short-wavelength shot-receiver residual statics to moveout-corrected CMP gathers, performing multichannel signal enhancement in the CMP domain, returning to the shot-receiver domain and perform additional multichannel signal enhancement to further attenuate coherent linear noise and random noise, performing prestack time migration of all shot gathers using a range of constant velocities, and obtaining a set of a velocity panels 602 that form said migration cube output 112. Rendering a demigration cube output 114 from said migration cube output 112 with a demigration cube calculation 104*a*. Rendering said synthesized zero-offset wavefield output 116 from said demigration cube output 114 with a zero-offset wavefield synthesis procedure 104*b*.

Said demigration cube output 114 comprises an unmigrated volume that contains all reflections and diffractions that are present in the signal-processed shot gathers.

Estimating said rms velocity field output 118 by limiting estimates within the bounds of time migration. Said rms velocity field output 118 comprises a one or more lateral velocity variations.

Performing multichannel signal processing to each of said velocity panels 602 of said migration cube procedure 102 to increase signal coherency.

Said migration cube output 112 comprises image volume in (V, X, T) coordinates. Said V comprises an rms velocity. Said X comprises a midpoint. Said T comprises an event time after migration.

Demigrating each of said velocity panels 602 within said migration cube output 112 using said range of constant velocities. Creating said demigration cube output 114.

Applying Radon transform to each of the velocity gathers in (V, T) coordinates of said demigration cube output 114, and. Reducing the horizontal smearing of amplitudes associated with finite cable length and discrete sampling along the offset axis.

Said zero-offset wavefield synthesis procedure 104*b* comprises calculating said synthesized zero-offset wavefield output 116 using said V, X and T coordinates of said demigration cube output 114 by summing over said V axis of said demigration cube output 114 to synthesize a zero-offset wavefield by said zero-offset wavefield synthesis procedure 104*b*, preserving all reflections and diffractions, and avoiding uncertainty in a velocity field since events are stationary both in time and space in said demigration cube output 114.

Summing within a velocity corridor rather than summing over the velocity axis of the demigration cube.

Estimating said rms velocity field output 118 from said migration cube output 112 using an rms velocity field calculation 106*a*. Said rms velocity field output 118 with lateral velocity variations within the bounds of time migration.

Performing a time migration calculation 108 of said synthesized zero-offset wavefield output 116 using said rms velocity field output 118. Creating a zero-offset wavefield time migration diagram 800 from a zero-offset wavefield time migration output 802 to serve as a principal image in time for structural interpretation.

Performing Dix conversion to said rms velocity field output 118. Obtaining an interval velocity field.

Performing poststack depth migration of said synthesized zero-offset wavefield output 116 using said interval velocity field. Creating a zero-offset wavefield depth migration diagram 900 as an auxiliary image in depth that can be used for structural interpretation.

Comparing a zero-offset wavefield time migration diagram 800 with a prestack time migration diagram 200 and noting the significant improvement of the structural complexity in the central portion of the line.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A zero-offset wavefield synthesis workflow to calculate a synthesized zero-offset wavefield output without the commitment to an rms velocity field output to circumvent velocity uncertainty, comprising:
    calculating a migration cube output with a migration cube procedure by
        estimating a first-wavelength shot-receiver statics based on stack-power optimization,
        estimating a model for a near-surface by nonlinear traveltime inversion applied to first-arrival times picked from shot gathers and calculate the a second wavelength shot-receiver statics and a third-wavelength shot-receiver statics,
        applying shot-receiver statics and an appropriate single-channel signal processing sequence to shot records,
        applying said short first-wavelength shot-receiver statics to moveout-corrected CMP gathers,
        performing multichannel signal enhancement in a CMP domain,
        returning to a shot-receiver domain and perform additional multichannel signal enhancement to further attenuate coherent linear noise and random noise,
        performing prestack time migration of all shot gathers using a range of constant velocities, and
        obtaining a set of a velocity panels that form said migration cube output;
    rendering a demigration cube output from said migration cube output with a demigration cube calculation; and
    rendering said synthesized zero-offset wavefield output from said demigration cube output with a zero-offset wavefield synthesis procedure;
    wherein;
        a third wavelength is longer than a second wavelength, and
        said second wavelength is longer than a first wavelength;
    wherein;
        said first wavelength shot-receiver statics characterize said first wavelength;
        said second wavelength shot-receiver statics characterize said second wavelength, and
        said third wavelength shot-receiver statics characterize said third wavelength;
    wherein, said near-surface comprises an unconsolidated upper portion of earth material below the earth's surface and above a subsurface comprising rock; and
    wherein, said moveout-corrected CMP gathers comprises a CMP gather having been corrected to remove the moveout effect on traveltimes.

2. The zero-offset wavefield synthesis workflow from claim 1, wherein:
    said demigration cube output comprises an unmigrated volume that contains all reflections and diffractions that are present in the signal-processed shot gathers.

3. The zero-offset wavefield synthesis workflow from claim 2, further comprising:
    estimating said rms velocity field output by limiting estimates within the bounds of time migration; and
    said rms velocity field output comprises a one or more lateral velocity variations.

4. The zero-offset wavefield synthesis workflow from claim 1, wherein:
    performing multichannel signal processing to each of said velocity panels of said migration cube procedure to increase signal coherency.

5. The zero-offset wavefield synthesis workflow from claim 4, wherein:
    said migration cube output comprises image volume in (V, X, T) coordinates;
    said V comprises an rms velocity;
    said X comprises a midpoint; and
    said T comprises an event time after migration.

6. The zero-offset wavefield synthesis workflow from claim 4, further comprising:
    demigrating each of said velocity panels within said migration cube output using said range of constant velocities; and
    creating said demigration cube output.

7. The zero-offset wavefield synthesis workflow from claim 6, wherein:
    applying Radon transform to each of the velocity gathers in (V, T) coordinates of said demigration cube output; and
    reducing the horizontal smearing of amplitudes associated with finite cable length and discrete sampling along the offset axis.

8. The zero-offset wavefield synthesis workflow from claim 7, wherein:
    said zero-offset wavefield synthesis procedure comprises calculating said synthesized zero-offset wavefield output using said V, X and T coordinates of said demigration cube output by
        summing over said V axis of said demigration cube output to synthesize a zero-offset wavefield by said zero-offset wavefield synthesis procedure, preserving all reflections and diffractions, and
avoiding uncertainty in a velocity field since events are stationary both in time and space in said demigration cube output.

9. The zero-offset wavefield synthesis workflow from claim 7, wherein:
said zero-offset wavefield synthesis procedure comprises calculating said synthesized zero-offset wavefield output using said V, X and T coordinates of said demigration cube output by
summing within a velocity corridor rather than summing over the velocity axis of the demigration cube,
preserving all reflections and diffractions, and
avoiding uncertainty in a velocity field since events are stationary both in time and space in said demigration cube output.

10. The zero-offset wavefield synthesis workflow from claim 8, wherein:
estimating said rms velocity field output from said migration cube output using an rms velocity field calculation; and
said rms velocity field output with lateral velocity variations within the bounds of time migration.

11. The zero-offset wavefield synthesis workflow from claim 10, wherein:
performing a time migration calculation of said synthesized zero-offset wavefield output using said rms velocity field output; and
creating a zero-offset wavefield time migration diagram from a zero-offset wavefield time migration output to serve as a principal image in time for structural interpretation.

12. The zero-offset wavefield synthesis workflow from claim 10, wherein:
performing Dix conversion to said rms velocity field output; and
obtaining an interval velocity field.

13. The zero-offset wavefield synthesis workflow from claim 12, wherein:
performing poststack depth migration of said synthesized zero-offset wavefield output using said interval velocity field; and
creating a zero-offset wavefield depth migration diagram as an auxiliary image in depth that can be used for structural interpretation.

14. The zero-offset wavefield synthesis workflow from claim 10, wherein:
comparing a zero-offset wavefield time migration diagram with a prestack time migration diagram and noting the significant improvement of the structural complexity in the central portion of the line.

15. The zero-offset wavefield synthesis workflow from claim 1, wherein:
zero-offset wavefield synthesis workflow is implemented on a portion of a one or more computers;
said one or more computers each comprise a one or more processors, a memory comprising a workflow application, and a communication hardware; and
workflow application comprises code configured for
receiving said migration cube output,
applying said zero-offset wavefield synthesis workflow, and
generating said time migration output.

16. A zero-offset wavefield synthesis workflow to calculate a synthesized zero-offset wavefield output without the commitment to an rms velocity field output to circumvent velocity uncertainty, comprising:
calculating a migration cube output with a migration cube procedure by
estimating a first-wavelength shot-receiver statics based on stack-power optimization,
estimating a model for a near-surface by nonlinear traveltime inversion applied to first-arrival times picked from shot gathers and calculate a second wavelength shot-receiver statics and a third-wavelength shot-receiver statics,
applying shot-receiver statics and an appropriate single-channel signal processing sequence to shot records,
applying said first-wavelength shot-receiver statics to moveout-corrected CMP gathers,
performing multichannel signal enhancement in a CMP domain,
returning to a shot-receiver domain and perform additional multichannel signal enhancement to further attenuate coherent linear noise and random noise,
performing prestack time migration of all shot gathers using a range of constant velocities, and obtaining a set of a velocity panels that form said migration cube output;
rendering a demigration cube output from said migration cube output with a demigration cube calculation; and
rendering said synthesized zero-offset wavefield output from said demigration cube output with a zero-offset wavefield synthesis procedure;
said demigration cube output comprises an unmigrated volume that contains all reflections and diffractions that are present in the signal-processed shot gathers;
estimating said rms velocity fields output by limiting estimates within the bounds of time migration;
said rms velocity field output comprises a one or more lateral velocity variations;
wherein,
a third wavelength is longer than a second wavelength, and
said second wavelength is longer than a first wavelength;
wherein,
said first wavelength shot-receiver residual statics characterize said first wavelength
said second wavelength shot-receiver statics characterize said second wavelength, and
said third wavelength shot-receiver statics characterize said third wavelength;
wherein, said near-surface comprises an unconsolidated upper portion of earth material below the earth's surface and above a subsurface comprising rock; and
wherein, said moveout-corrected CMP gathers comprises a CMP gather having been corrected to remove the moveout effect on traveltimes.

17. A zero-offset wavefield synthesis workflow to calculate a synthesized zero-offset wavefield output without the commitment to an rms velocity field output to circumvent velocity uncertainty, comprising:
calculating a migration cube output with a migration cube procedure by
estimating a first-wavelength shot-receiver statics based on stack-power optimization,
estimating a model for a near-surface by nonlinear traveltime inversion applied to first-arrival times picked from shot gathers and calculate a second wavelength shot-receiver statics and a third-wavelength shot-receiver statics,
applying shot-receiver statics and an appropriate single-channel signal processing sequence to shot records, applying said first-wavelength shot-receiver statics to moveout-corrected CMP gathers, performing multichannel signal enhancement in a CMP domain, returning to a shot-receiver domain and perform additional multichannel signal enhancement to further attenuate coherent linear noise and random noise, performing prestack time migration of all shot gathers using a range of constant velocities, and obtaining a set of a velocity panels that form said migration cube output;

rendering a demigration cube output from said migration cube output with a demigration cube calculation; and rendering said synthesized zero-offset wavefield output from said demigration cube output with a zero-offset wavefield synthesis procedure;

performing multichannel signal processing to each of said velocity panels of said migration cube procedure to increase signal coherency;

said migration cube output comprises image volume in (V, X, T) coordinates;

said V comprises an rms velocity;

said X comprises a midpoint;

said T comprises an event time after migration;

demigrating each of said velocity panels within said migration cube output using said range of constant velocities;

creating said demigration cube output;

wherein;
  a third wavelength is longer than a second wavelength, and
  said second wavelength is longer than a first wavelength;

wherein;
  said first wavelength shot-receiver statics characterize said first wavelength;
  said second wavelength shot-receiver statics characterize said second wavelength, and
  said third wavelength shot-receiver statics characterize said third wavelength;

wherein, said near-surface comprises an unconsolidated upper portion of earth material below the earth's surface and above a subsurface comprising rock; and wherein, said moveout-corrected CMP gathers comprises a CMP gather having been corrected to remove the moveout effect on traveltimes.

18. The zero-offset wavefield synthesis workflow from claim 17, wherein:

applying Radon transform to each of the velocity gathers in (V, T) coordinates of said demigration cube output; and reducing the horizontal smearing of amplitudes associated with finite cable length and discrete sampling along the offset axis.

19. The zero-offset wavefield synthesis workflow from claim 18, wherein:

said zero-offset wavefield synthesis procedure comprises
  calculating said synthesized zero-offset wavefield output using said V, X and T coordinates of said demigration cube output by
  summing over said V axis of said demigration cube output to synthesize a zero-offset wavefield by said zero-offset wavefield synthesis procedure,
  preserving all reflections and diffractions, and
  avoiding uncertainty in a velocity field since events are stationary both in time and space in said demigration cube output.

20. The zero-offset wavefield synthesis workflow from claim 18, wherein:

said zero-offset wavefield synthesis procedure comprises
  calculating said synthesized zero-offset wavefield output using said V, X and T coordinates of said demigration cube output by
  summing within a velocity corridor rather than summing over the velocity axis of the demigration cube,
  preserving all reflections and diffractions, and
  avoiding uncertainty in a velocity field since events are stationary both in time and space in said demigration cube output.

* * * * *